United States Patent [19]

Huffman et al.

[11] 4,242,756
[45] Dec. 30, 1980

[54] MULTILINE SWITCHING PROTECTION APPARATUS

[75] Inventors: Charles E. Huffman, Plano; Robert J. McGuire; Herbert E. Welch, both of Richardson, all of Tex.

[73] Assignee: Rockwell International Corporation, El Segundo, Calif.

[21] Appl. No.: 41,276

[22] Filed: May 21, 1979

[51] Int. Cl.³ .......................................... H04B 1/60
[52] U.S. Cl. ........................................ 455/8; 371/8
[58] Field of Search ................ 325/3; 178/70 R, 70 S; 455/8; 371/8

[56] References Cited

U.S. PATENT DOCUMENTS

| | | | |
|---|---|---|---|
| 3,065,420 | 11/1962 | Close | 325/3 |
| 3,111,624 | 11/1963 | Farkas | 325/3 |
| 3,588,700 | 6/1971 | Shiki | 325/3 |
| 4,039,947 | 8/1977 | Miedema | 325/3 |
| 4,161,694 | 7/1979 | Weber | 325/3 |

*Primary Examiner*—Harold I. Pitts

*Attorney, Agent, or Firm*—Bruce C. Lutz; Howard R. Greenberg; H. Frederick Hamann

[57] ABSTRACT

A concept is illustrated for protecting active components in a multiline repeater station switching system to a state of "fail operability". This is accomplished by dividing the signal received on the single spare IF transmission line into IF and baseband signals and applying the divided set of signals to two spare switches. Thus, there is provision for using the spare line as either a repeat line staying at the IF frequency or as a drop line at baseband frequency. The same concept is used in the transmit portion wherein the output of two spare switches is combined to be transmitted over a single IF line. Thus, the single line can be used to input either a repeated IF signal or an insert baseband signal. A further concept of the invention is to make both the IF and baseband switching modules identical in electrical contact construction so that the multiline switch can be easily altered into any desired set of repeat and drop or insert combinations.

7 Claims, 6 Drawing Figures

MULTILINE SWITCHING PROTECTION APPARATUS

BACKGROUND AND SUMMARY

The present invention is generally concerned with electronics and more specifically concerned with multiline switch systems for use with switching at least two different frequencies wherein "fail operational" capability is desired for both frequencies. Even more specifically, the present invention is directed to multiline switching repeater stations situated in microwave networks.

Conventional multiline switches provide protection for either IF or baseband signal paths in a microwave radio system. Multiline protection switches are used to protect against interruptions or degradations to microwave working channels which may be caused by radio equipment failures or severe propagation fading. When one of the n working channels fails, the working channel traffic is automatically transferred to the spare channel. After the working channel returns to normal conditions, the traffic which was previously switched to spare is restored to its normal working path. The spare channel is now available for protection against other failures which may occur on any of the working channels. Baseband protection switches are used at the terminal ends of the microwave system since baseband frequencies are required as a normal form for message or video traffic interfacing with other equipment. IF (intermediate frequency) protection switches are used at intermediate repeaters in order to subdivide the system into switching sections. Having multiple switching sections increases the reliability of the system since independent switching can occur in each section to protect against multiple failures in the total microwave system.

IF switches are used at switching repeaters in lieu of baseband switches because the normal signal, connected through the station, is IF. The use of IF switches avoids the use of remodulating equipment in the radio equipment. It is important to avoid remodulating where not necessary since remodulating equipment introduces noise into a microwave channel and degrades the transmission characteristics of that channel. It is thus desirable to minimize the number of times signals are passed through remodulating equipment in a long haul microwave system.

Multiline baseband switches and multiline IF switches are normally formed by two different sets of equipment. In other words, one multiline switch contains only baseband switches and a further one or more multiline switches contain only IF switches. The switching elements are different because IF and baseband signals are formed at substantially different signal levels and frequencies and the switch for switching baseband signals will not provide satisfactory signal passing characteristics to IF signals and vice versa.

In prior art U.S. multiline baseband switches, it is conventional to supply only one spare radio transmission path and accordingly one spare switch. As outlined, above, however, this switch is of the same type as all the rest of the switches in the switch equipment. This is true whether the switch is a baseband switch or an IF switch. In Europe and some other foreign countries, it is conventional to have two spare radio channels and thus there are two spare IF or two spare baseband switches. Again, however, all known prior art uses the same type switch throughout a given piece of equipment. Where there are two spare systems, (in Europe) two working channels may be switched to the two spares simultaneously. It will be realized, that in the Unites States only one spare radio path is allowed in a microwave system by FCC regulations.

It should be further realized that at IF switching repeaters, it is often required that access to one or more of the IF working channels be provided so that baseband traffic can be dropped and inserted into the microwave system. Baseband drop and insert has been accomplished in the prior art by using redundant frequency modulated receivers (FMR's) and frequency modulated transmitters (FMT's) which are connected to the channel (or channels) having the drop and insert requirements. Redundant FM equipment, with sensors, switches and switching logic is required in order to protect against circuit outage due to equipment failure in the drop or insert signal path. Those channels having no drop and insert requirements are patched between the IF receive switch and the IF transmit switch at the repeater station. The advantage to this approach in the prior art is that channels which are not involved in the drop and insert are maintained at IF frequencies thereby minimizing the distortion and degradation of the transmission characteristics of the channel.

Another approach used in the prior art in implementing a drop and insert repeater station involves equipping the repeater with back to back baseband, multiline switches instead of IF switches. This approach eliminates the need for separate FMT and FMR equipment on those channels requiring drop and insert capabilities. The disadvantage to this approach is that all channels must be equipped with FMR and FMT equipment in order to convert the signals on all channels to baseband. This approach adds FMR and FMT equipment to those channels not requiring drop and insert capabilities with the resulting disadvantage that performance degradation is introduced into those channels not requiring drop and insert capabilities.

The present invention overcomes the difficulties of the prior art by using two separate spare switches with a single radio transmission channel wherein one of the spare switches is a baseband switch and the other is an IF switch. Additionally, the multiline switch equipment is configured such that the IF and baseband switches have interchangeable connection capabilities. Thus, any given multiline switch can be used in any combination of baseband and IF switches. If there is degradation of performance in any given channel, it can be switched to the appropriate baseband or IF spare switch and the spare IF channel may be utilized to provide the signals. In other words, baseband drop and insert is accomplished by using a multiline combination switch which provides the capability of providing any working channel slot with switches for either IF or baseband signals. This approach also uses one set of FMR and FMT equipment on each working channel having drop and insert and one set of FMR and FMT equipment on the spare channel which provides protection by the multiline switch. (i.e. external protection is not needed.) Thus, the total amount of equipment required to accomplish a given combination of repeater and drop and insert functions is substantially less than in the prior art.

It is therefore an object of the present invention to provide an improved multiline dual frequency switch.

Other objects and advantages of the present invention will be apparent from the reading of the specification and appended claims in conjunction with the drawings wherein:

DETAILED DESCRIPTION

Figure 1:
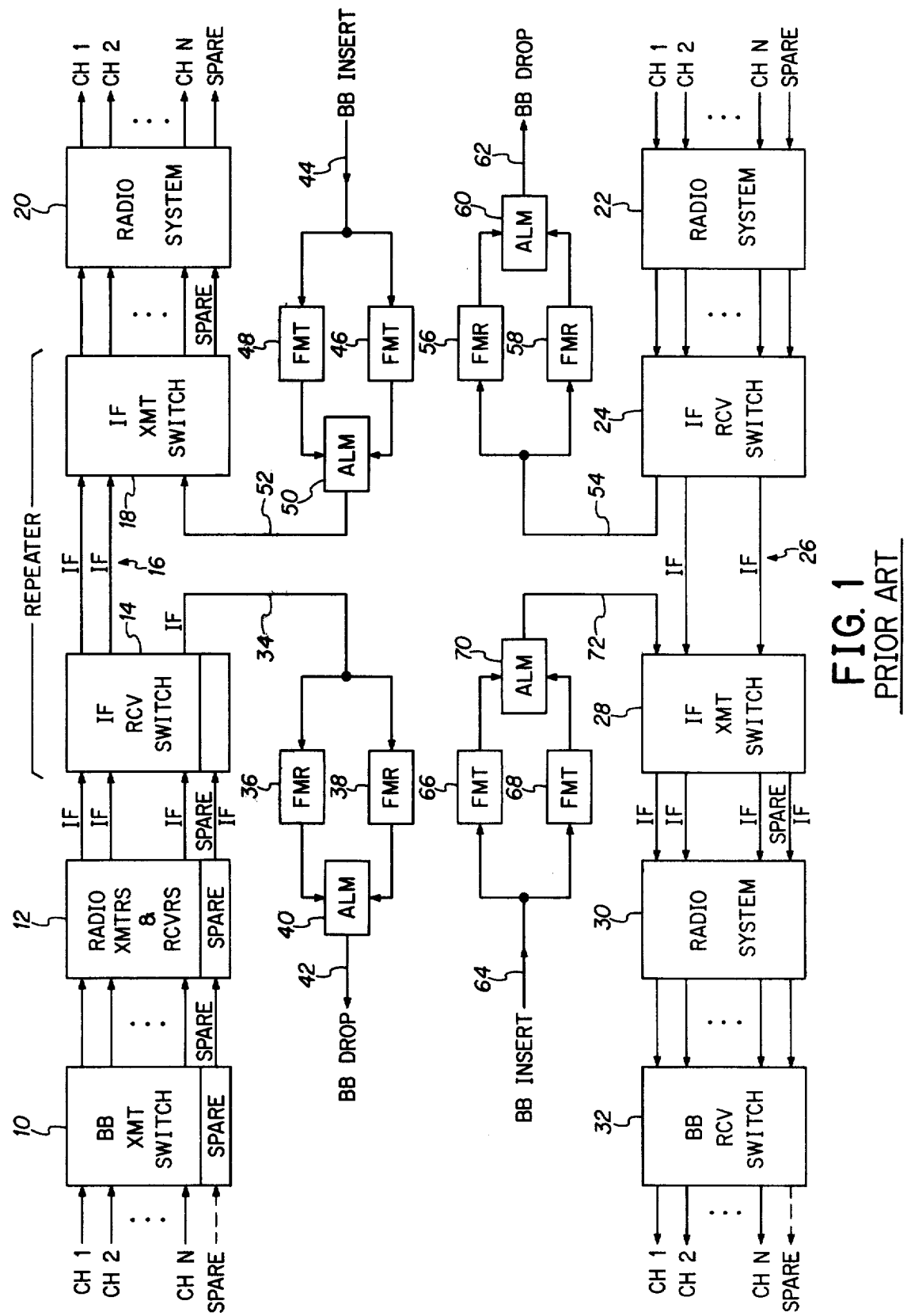
FIG. 1 is a block diagram of one embodiment of prior art multiline repeater switches.

In the prior art diagram of FIG. 1 a baseband transmit switch 10 is shown supplying a plurality of signals to a set of radio transmitters and receivers block 12. Block 12 includes the necessary transmission stations and media to make up a transmitter and receiver network. IF signals are output from the block 12 to an IF receive multiline switch 14 which is part of a repeater station. The signals to be retransmitted to further stations are applied on a set of leads 16 to a further multiline switch 18 for use as a transmitter. This switch supplies a plurality of signals to a further radio transmitter system 20 which may be another repeater station or a termination station. The numbers 10 through 20 describe the blocks in one side of a duplex transmission system. On the other side is a similar radio system block 22, an IF receive multiline switch 24, IF lines to be repeated 26, an IF transmit switch 28, a radio system 30 and a baseband receive switch 32 for supplying return signals from the reply station back to the source of original signals being supplied to baseband transmit switch 10. The repeater station includes the IF receive and transmit switches 14, 18, 24, and 28, and also includes part of each of the radio transmitter and receiver systems shown as blocks 12, 20, 22 and 30. A "drop" line 34 is shown supplying signals to two FM receivers (FMR's) 36 and 38 whose outputs are combined in an alarm sensor logic switch 40 before being submitted as a final baseband drop on line 42. Insert signals on the same side of the repeater are supplied from a baseband insert lead 44 to a pair of frequency modulated transmitters (FMT's) 46 and 48 whose outputs are combined in a further alarm sensor logic switch 50 before being supplied on a lead 52 as an insert signal at an IF frequency to the switch 18. A similar configuration is shown on the lower side of FIG. 1 with an IF signal being supplied on a lead 54 to a pair of FMR's 56 and 58 whose outputs are combined in block 60 and output on a baseband drop line 62. Likewise, a baseband insert signal is supplied on a lead 64 to a pair of FMT's 66 and 68 whose outputs are combined in an alarm sensor logic switch 70 and whose output is supplied on a lead 72 as an IF input to the switch 28.

Figure 2:
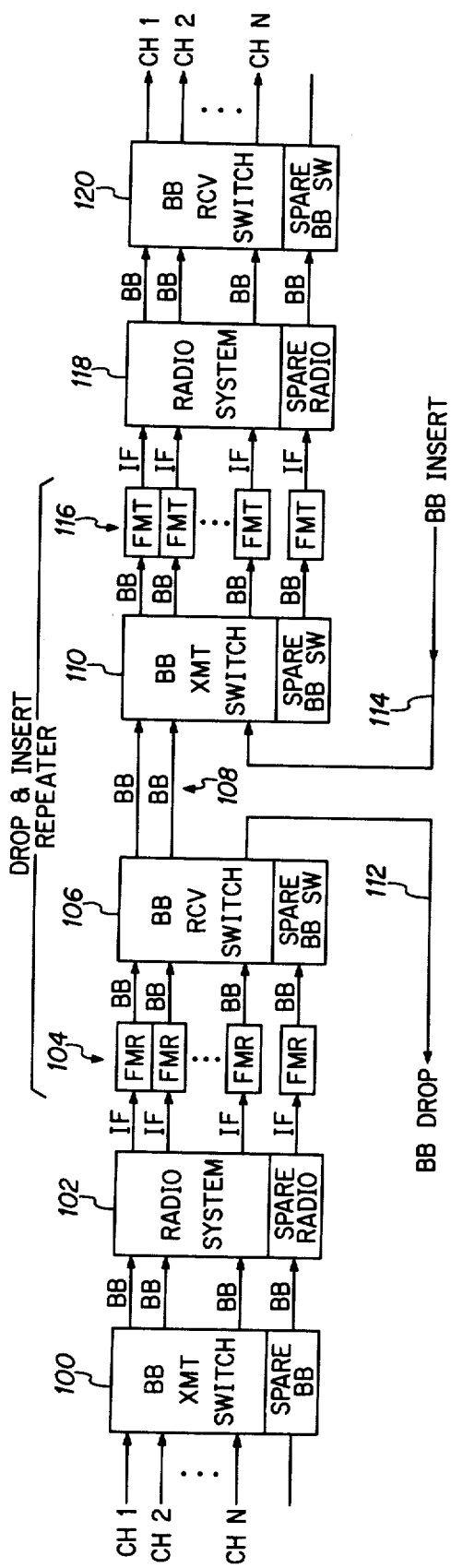
FIG. 2 is an illustration of a second prior art multiline repeater switch system.
Figure 2:
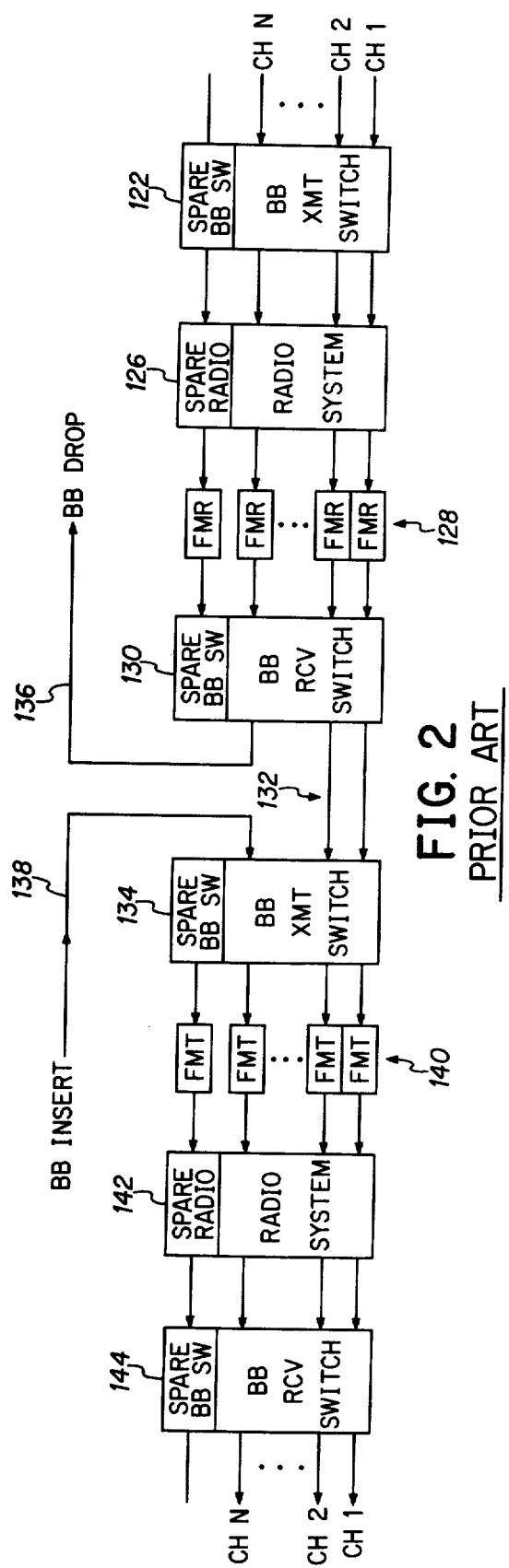

In the prior art FIG. 2, a plurality of channel transmission signals are supplied to a baseband transmit switch 100 which supplies signals to a transmit and receive radio system 102 and whose outputs at IF are each converted to baseband through a set of FMR's 104. The outputs of the FMR's supply baseband signals to a baseband receive switch 106. The signals to be repeated and retransmitted are supplied as a set of baseband leads 108 to a baseband transmit switch 110. The drop signals are supplied on a separate set of leads such as 112 to a baseband drop load. The baseband insert signal is supplied on a lead 114 as a further baseband input to the baseband transmit switch 110. The outputs of the baseband transmit switch 110 are supplied as a set of baseband signals to a set of FMT's 116 whose outputs at the intermediate frequency are supplied to a radio system 118. The outputs of the radio system are again transferred to baseband so as to be switched in a baseband receiving switch 120 before being output as signals to a load and normally use the switches internal thereto for passage to switch 170. On the other half of the duplex system, similar blocks are shown to provide the return path for the signals. In other words, a baseband transmit switch 122 supplies baseband signals to a radio system 126 including the microwave transmission and reception portions and the radio system outputs IF signals which are supplied to FMR's 128 which supply baseband signals to a baseband receive switch 130. The signals to be repeated and retransmitted are supplied on a set of leads 132 to a baseband transmit switch 134. The drop signals are supplied on leads such as 136 to a load. Insert signals are supplied on leads such as 138 as additional inputs to the baseband transmit switch 134 which outputs baseband signals to a set of FMT's 140 whose outputs are supplied at the IF frequency to a radio system designated as 142. At the other end of the radio system, baseband signals are supplied to a baseband receive switch 144 which returns signals to the sources connected to the top half of the transmission system.

Figure 3:
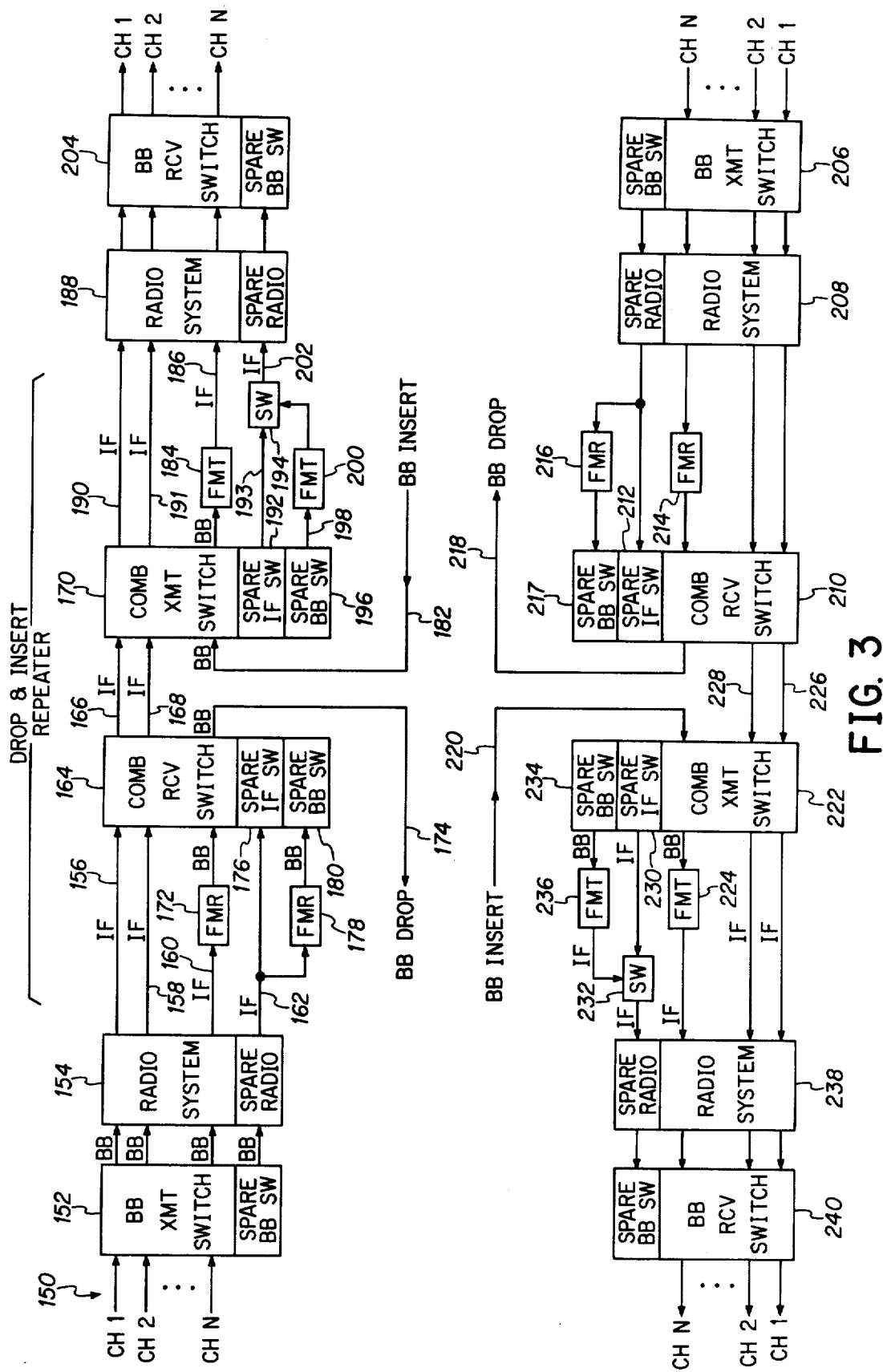
FIG. 3 is a block diagram of the present inventive concept for a multiline repeater switch.

In FIG. 3, a plurality of signal sources designated channels 1 to n (generally 150) supply signals to a baseband transmit switch 152. This transmit switch is substantially identical to those shown in previous FIGS. 1 and 2 and includes a spare baseband switch. Each of the outputs from transmit switch 152 is at the baseband frequency and is supplied to a radio system 154 including both transmit and receive portions. This radio system may include a plurality of receive and retransmit stations before a repeater is needed or required by reliability determinations. In any event, the output of the radio system 154 is illustrated as a plurality of IF lines such as 156, 158, 160 and 162. The line 162 is the spare line while lines 156 through 160 are the n working, regular or normal lines. The line 162 in addition to being designated as a spare line is also designated in the trade as being a protection or standby channel or line. For IF signals which are to be merely repeated and retransmitted, the IF lines are connected directly to a combination multiline receive switch 164. These signals are output on lines such as 166 and 168 to a combination multiline transmit switch 170. If the line is to drop a signal such as shown for 160, it is applied to an FMR such as 172 and converted to baseband before being applied to a baseband switch internal to multiline receive switch 164. This signal is normally output on a line such as 174 to a load. The spare channel 162 is applied directly to a spare IF switch at 176 and is also applied through an FMR 178 to a baseband spare switch 180. A baseband insert line 182 on the topside of FIG. 3 is applied to a baseband switch within combination transmit switch 170. The output of this switch is applied as a baseband signal to an FMT 184 which supplies an IF signal on 186 to a radio system 188. System 188 also receives IF signals on lines 190 and 191 directly from the transmit switch 170 which are merely being repeated and retransmitted. An IF output from combination switch 170 is also provided from a spare IF switch 192 on a lead 193 to a switch 194. An output from a spare baseband switch 196 is output on a lead 198 to an FMT 200 which also provides an input to switch 194. The signal output by FMT 200 is at the IF frequency and thus switch 194 provides one of the two output signals as originally supplied on leads 193 or 198 as an IF signal on line 202 to a spare or protection channel of radio system 188. The output of system 188 is at baseband frequencies and these signals are supplied to a baseband receive switch 204 which provides signals to a destination load at baseband frequencies. On the other half of the duplex system shown, a baseband transmit switch 206 is shown supplying baseband signals to a radio system 208 including a spare channel which system supplies IF signals to a combination receive switch 210 similar to switch 164. As illustrated, these signals are supplied to a spare IF switch 212 within switch 210 and to FMR's 214 and 216. The output of 216 is at baseband and is supplied to a spare baseband switch 217. The output from FMR 214 is also baseband and is supplied through an appropriate baseband switch within 210 and then output on a baseband drop lead 218. Insert signals are supplied on a baseband insert lead 220 to a combination transmit switch 222 for outputting to an FMT 224. Combination transmit switch 222 also receives IF signals directly from combination receive switch 210 on leads 226 and 228. A spare IF switch 230 within block 222 supplies IF signals to a switch 232 and a spare baseband switch 234 supplies baseband signals through an FMT 236 to the switch 232. As shown, a plurality of IF signals are then supplied to a radio system 238 which transmits, receives and at a distant point supplies further baseband signals to a baseband receive switch 240. As illustrated, each of the blocks outside the repeater station contains a single spare since they all operate at the same frequency. Only the switches within the repeater station need have the different frequency spares and then only if there is to be a drop and/or insert function at that repeater station. If there is no drop or insert function, all the channels would be IF and there would be no requirement for an additional baseband spare. Likewise, if all incoming channels were to be dropped, there would be no requirement for an extra IF spare.

Figure 4:
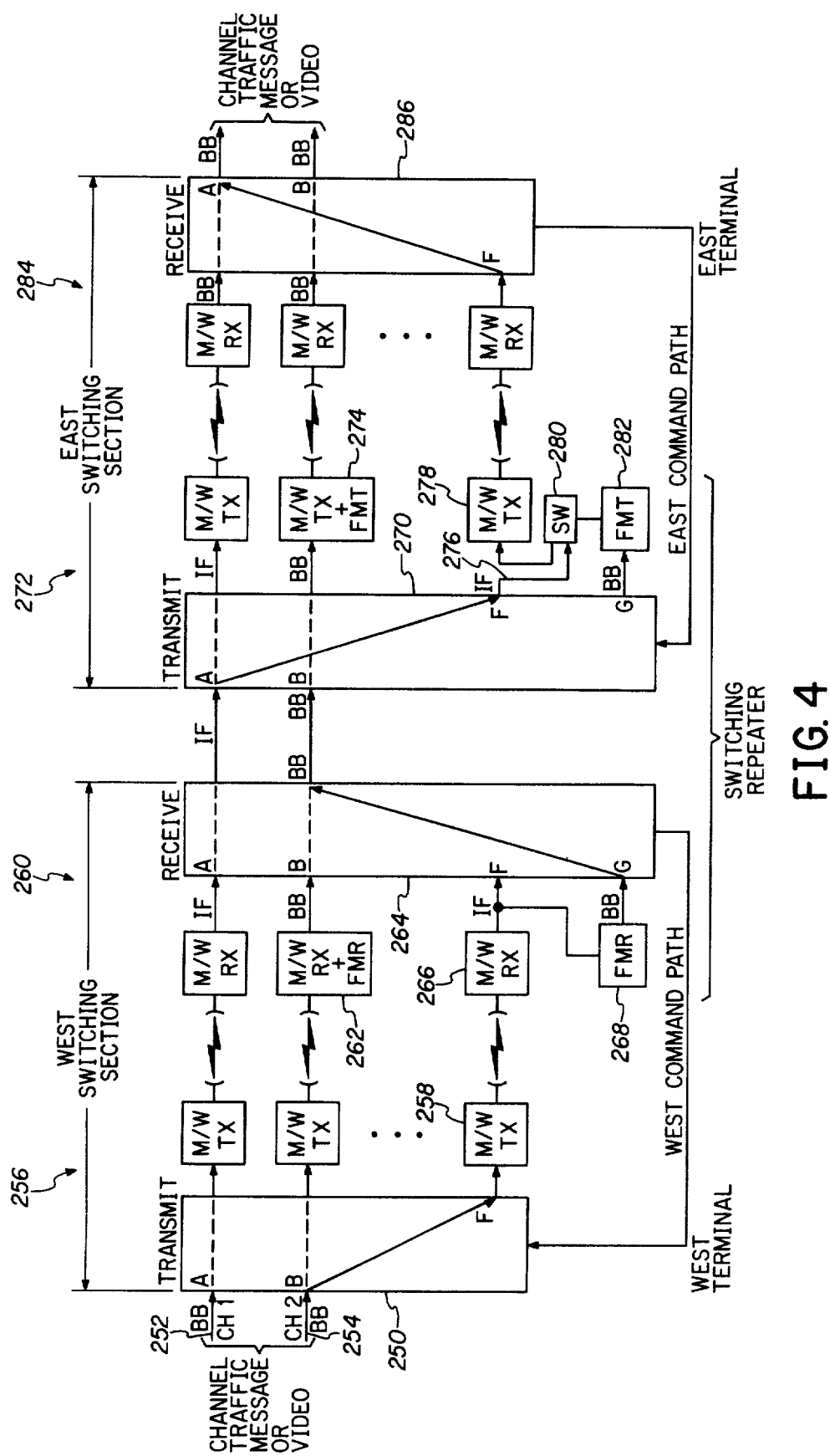
FIG. 4 is a block diagram illustrating the operation of FIG. 3.

In FIG. 4 a portion of FIG. 3 is shown and is used primarily to illustrate the switching action, due to an inoperative channel condition, in half of the duplex system shown in FIG. 3. As illustrated, a transmit block 250 receives inputs on leads such as baseband inputs 252 and 254. Within block 250 there is a single spare and this operates at baseband frequencies. The outputs of transmit switch 250 are supplied to microwave transmitters generally designated as 256 and specifically have a spare channel transmitter 258. Signals are transmitted through the air on environment to a set of microwave receivers generally designated as 260. If a particular channel is to have a drop function, that particular receiver additionally requires an FMR as part of the receiving equipment. As shown, a microwave receiver 262 is to have a drop function and thus a baseband signal is supplied on input B to a receive combination multiline switch 264 while the A channel is to be repeated and retransmitted. It should also be noted that as designated, the transmitter 250 and receive unit 264 are labeled as being part of a west switching section while the remaining portion of the circuit is the east switching section. The spare channel has a microwave receiver specifically designated as 266 which supplies IF signals directly to an F input on receive switch 264 and through an FMR 268 to a G input at baseband within receive switch 264. A transmit combination multiline switch 270 is shown receiving insert baseband signals at input B, IF signals at input A and further signals are not shown. The block 270 provides IF output signals to a set of microwave transmitters 272 and specifically provides a baseband signal to a combination microwave transmitter and FM transmitter or FMT 274. Additionally, an IF signal is provided on a lead 276 to a microwave transmitter 278 after being passed through a switch 280. A baseband signal is supplied to an FMT 282 and after conversion to IF frequencies is also supplied to switch 280. Thus, the microwave transmitter 278 is the spare or protection channel transmitter. All the microwave transmitters 272 are connected to corresponding microwave receivers generally designated as 284 which receive the signals, convert these to baseband and apply them to a receive baseband switch generally designated as 286. There is detection and switching circuitry internal to 286 so as to utilize the spare channel when necessary to provide quality output signals to the load labeled as "Channel Traffic Message or Video".

Figure 5:
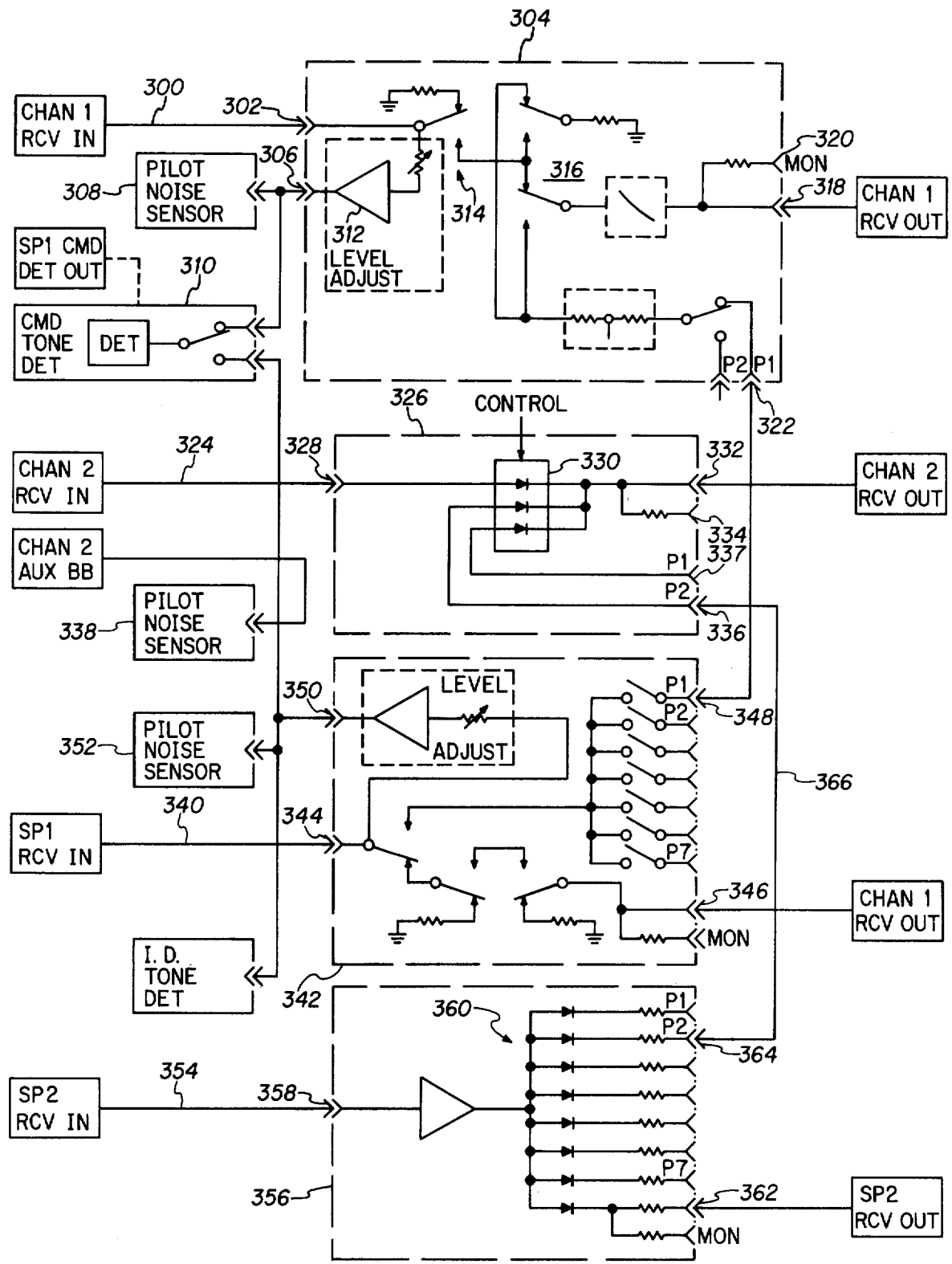
FIG. 5 is a more detailed block diagram of the multiline switch portion of the system as applies to the receive multiline switch.

In FIG. 5, a baseband input is shown supplied on a lead 300 to a first input 302 of a baseband receive switch 304. A signal quality detection output is provided on output 306 to a pilot noise sensor 308. This detection signal is also supplied to a command tone detector 310. Internal to block 304, the input baseband signal on 302 is supplied through an amplifier 312 to the output 306 and is also supplied through a set of switch contacts 314 to a further set of switch contacts 316. In the conditions shown, signals input on 302 are output through switches 314 and 316 to an output lead or terminal 318. Also illustrated are a monitor output 320 and an alternate (P1) input 322 for receiving signals from the spare channel. An unused P2 input is also illustrated since P2 is used in other configurations such as a two spare system. An IF signal is input to the multiline switch of FIG. 5 on a lead 324 to a block designated as 326 at an input terminal 328 corresponding electrically to input terminal 302. The signals are passed through a set of controlled switches 330 and output on an output terminal 332 to the output of the multiline switch. The terminal 332 of IF switch module 326 corresponds to terminal 318 of baseband switch module 304. The module 326 also has a monitor terminal 334 and a spare or auxiliary (P2) input terminal 336 in addition to an unused auxiliary (P1) input 337. Control signals are supplied to each of the modules by means not shown, but act to control the operation of the relays within block 304 and the diode switches within block 330 of the IF switching module 326. A pilot noise sensor 338 is shown for detecting quality of the signal in channel 2, but this information is received from the IF receiver rather than from the module as shown in conjunction with the baseband switch 304. The spare baseband input signal is received on line 340 and supplied to a baseband receiving module 342 which has an input terminal 344 corresponding to the previously mentioned inputs 302 and 328. After being passed through the various switches, it can be output at a terminal 346 if appropriate or can be switched by the multiline switch to an output such as 348 for supplying signals to the baseband switch 304.

The module 342 is also connected to supply output signals at terminal 350 to a pilot noise sensor 352. Finally, an IF spare signal channel, shown as 354, supplies signals to a block labeled 356 at an input terminal 358 thereof. This signal is amplified before being supplied through diode switches generally designated as 360 to either a multiline switch output such as 362 or it can be output after being switched to another IF switching module such as shown at output 364 where it is connected via a lead 366 to input 336 of IF switching module 326.

As previously indicated, the subject matter of FIG. 5 provides an illustration in more detail of the contents of a multiline combination receive switch such as 164 as used in one embodiment of the invention. Although it is believed that the disclosure is complete and adequate to enable one skilled in the art to practice the invention, especially in view of the multiline switches on the market by Bell Telephone Company and others, additional information on the internal operations of a multiline switch may be obtained from a copending application, Ser. No. 041,275, filed the same day as this application and assigned to the same assignee as the present invention.

Figure 6:
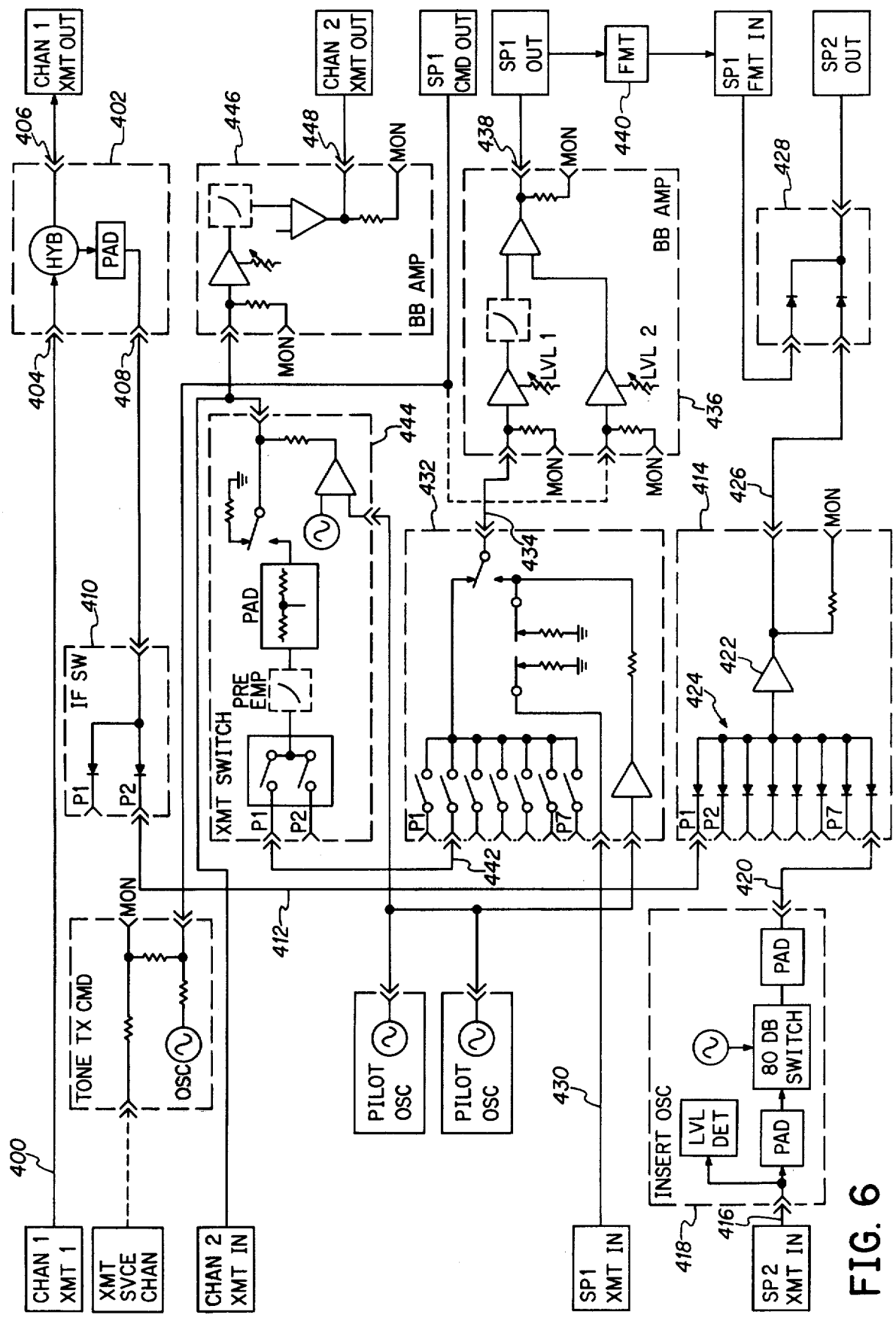
FIG. 6 is a more detailed diagram of the transmit portion of the multiline switch.

In FIG. 6, the internal workings of a transmit switch such as combination transmit switch 170 are illustrated. As indicated, the channel 1 signal is an IF signal and is designated as 400 and is supplied as a first input to a module 402 at an input terminal 404 thereof. This signal is passed through a directional coupler, signal splitter or hybrid and output on a lead appearing at output terminal 406. If there are problems on channel 1, the signals which are continuously supplied to 410 from 402 via 408 are passed to a module 414 upon activation of the switch in 410 which passes signals on a lead 412 to the spare IF switching module 414. A spare IF signal may be input on a lead 416 to an insert signal oscillator 418 where the signal is normalized before being applied on a lead 420 to the module 414. If the signal is to be passed through the transmit switch at the spare channel level, it is output through an amplifier 422 after being passed through the set of switches 424 on a lead 426 to a switch 428. Switch 428 corresponds to a switch such as 194 in FIG. 3 and is of the same construction as switch 410 previously discussed. A spare baseband signal is supplied on a lead 430 to a baseband multiline spare switch generally designated as 432 and corresponding generally to spare baseband switch 196 of FIG. 3. It is determined by input switching control signals applied to switch 432 as to where this signal is to be output. If it is to stay on the spare channel, it is output on a lead 434 to a baseband amplifier 436. The baseband amplifier 436 has an output signal at baseband provided at output terminal 438. This signal is then passed through an FMT 440 to a second input of switch 428. FMT 440 corresponds generally to FMT 200 of FIG. 3. If the input to the baseband channel xxx is to be output to the spare channel, it is passed through the switches internal to block 444 and output on a lead such as 442 to a spare baseband switch such as designated by 432. After being passed through spare baseband switch 432, it is supplied to a baseband amplifier 436 via lead 434 before being output at a terminal 438 as a working channel baseband signal switched to the spare channel. The signals from 438 are passed through an FMT such as 440 before being supplied to the radio system and rebroadcast.

While the modules in the receive switch, such as shown in FIG. 5, have physical characteristic such that all the components of a single baseband or IF switch can be accommodated in a single module, the characteristics of the components in the transmit section are such that it physically requires (in accordance with design contraints imposed on the inventors) two separate modules to perform the function for the baseband operation. While all the IF functions can be performed in a single module, the present invention uses electrically identical externally connectable modules in the multiline switch so that any given channel can be easily changed from baseband to IF operation and vice versa. Thus, there are two modules for each of the baseband and IF switch channels including the spares.

OPERATION

As previously indicated, the prior art has provided microwave radio systems having repeaters based on configurations similar to that shown in either FIGS. 1 or 2. In both cases, the receive and transmit switches have all been of the same frequency type. In other words, as shown in FIG. 1, all the receive switches are at the IF frequency including the spare. To obtain some type of protections for the FMR's and the FMT's, there has been at least duality so as to provide protection in case one of the FMR's or FMT's were to fail. An alarm switch such as 40 or 50 was used to sense which FM (frequency modulated) unit was operative and this was the channel chosen to provide the output signal. These sensors and switches were also used to provide an alarm to indicate that there was a problem in the transmission line. The main problem with the repeater implementation of FIG. 1 is that it requires at least the duality concept of redundancy to provide a form of protection. It is much more desirable to leave these receivers and transmitters in the switched loop rather than taking them outside the loop as shown. Some customers have not considered duality to be sufficient protection and have required even more redundancy.

The approach of FIG. 2 does keep the FMR's and FMT's in the main protection circuit of the switched system. However, there is not only the added cost of requiring an FMR for each of the lines being received and an FMT for each of the lines being transmitted, there is the additional problem of extra distortion (an completely unnecessary distortion) put into the lines which are merely passing through the repeater. As is well known, any time there is a frequency alteration of a signal, there is distortion introduced into the signal. However, the distortion introduced in changing from the carrier used in the radio system to IF is much, much less than that introduced by going from the IF frequencies down to baseband. The same holds true on the transmit side wherein the distortion introduced going from baseband to IF is far greater than that introduced by going from IF to the carrier frequencies used in the radio system such as 118. Thus, in the approach of FIG. 2 not only is additional distortion introduced where not necessary, but there is the additional expense of the extra FM receivers and transmitters.

While it may seem obvious from hindsight, the present inventors were the first to realize that a single multiline switch such as 164 could contain both baseband and IF switches and still provide the protection necessary from the FCC required single IF spare channel. This is accomplished in FIG. 3 by dividing the spare transmission channel into both an IF signal and a baseband signal and applying these to separate spare switches. The combination switch is then configured to check the identity of each of the switches contained therein so that it will be known whether the switch is an IF switch or a baseband switch. Upon detection of failure of a given working channel, the control can then send signals back to the previous transmitting station (such as that designated "West Command Path" in FIG. 4) and tell it to switch to the spare channel. The multiline switch 164 then internally switches to receive the spare channel information in the same type of switch as that just recently disabled. In other words, if the faulty signal condition was detected on line 160, a baseband spare switch such as 180 is activated whereas if an IF line such as 156 is detected as being faulty, the spare IF switch 176 is activated. These switches are connected internally so that they will provide the signal input on spare IF channel 162 to either the baseband output 174 or the IF output 166 respectively.

The same general conditions hold for the transmit section of the repeater wherein the receive switch 204 recognizes that it is not receiving proper signals on the working channel shown as 186. In such an event, it sends signals back (via a command path, not shown) to the transmit switch 170 requesting that the spare transmission channel be used. Switch 170 checks to determine that a baseband switch is the one involved with IF channel 186 (channel N) and thus inserts the spare baseband switch 196. This signal is passed through FMT 200, the switch 194, and on to spare transmission channel 202. After being passed through the radio system 188, it is received by baseband receive switch 204 where it is connected internally to output channel N. If, on the other hand, the baseband switch 204 determines that channel 1 signals are not being received properly, it sends back information on the command path to combination transmit switch 170 indicating that it is receiving improper signals on channel 1. Combination transmit switch 170 then switches the incoming signals on line 166 to spare IF channel 192 which outputs these on line 193 and passes the signals through switch 194 so that they are received at the same input on baseband switch 204. Since the baseband switch within 204 is providing all baseband output signals to particular loads, it will use the same type baseband switch throughout. However, the signal is not passed through any more baseband switches using the spare than it would have been using working channel 1 when it was operative.

Since the transmission system being described is a full duplex system, the same actions occur on the return signal side shown in the lower portion of FIG. 3.

As will be realized by those skilled in the art, there is no requirement for the present inventive concept insofar as signal quality is concerned where all the incoming signals are to be dropped or all are to be retransmitted since in either of these cases, the prior art systems will work very satisfactorily using the configuration of FIG. 1 if they are all to be retransmitted and using the configuration of FIG. 2 if they are all to be dropped. The invention, however, is completely usable in either of these situations since the modules comprising the IF and baseband switches were designed such that they are identical in electrical connection configuration and thus either one can be plugged into the openings provided. Therefore, the cost of equipment can be minimized since a single rack can be used for a combination switch, an all IF switch, or an all baseband switch. Further, the same rack can be used in the U.S. and in foreign countries since in foreign countries two spare transmission channels are allowed and thus the switch can merely use a spare IF channel and a spare baseband channel if such is desired in countries outside the U.S. rather than dividing the signal for receive operation or combining it for transmit operation as is required for efficient operation in the U.S. In the alternative, the two spare transmission channels, when the rack is used in foreign countries, can be equipped with either two spare IF's or two spare baseband units. In such an instance, the system is like either FIGS. 1 or 2 except for the fact that there are two spares rather than one.

The illustration in FIG. 4 is an attempt to provide a slightly clearer understanding of the connections occurring in FIG. 3. As previously indicated, FIG. 4 merely shows half (the top half) of FIG. 3 and thus one direction of communication. As drawn, it is assumed that channel 2 is inoperative on the "west" side and thus the switch 250 reconnects the electric signals internally to the B input at 254 and the F output to microwave transmitter 258. The signal is transmitted and received by microwave receiver 266. It is output from receiver 266 to the F input of receive switch 264. However, the receive switch 264 has previously indicated that received signals are faulty or improper and has provided an output on the west command path to the west terminal 250 that it wanted the west terminal to transmit signal on channel 2 through the spare channel. The receive station 264 has also previously determined that channel 2 is a baseband drop channel and thus it has already configured itself to supply signals at output B only from input G which is the portion of the switch having a baseband switch. Thus, the signal's input at input F are completely ignored and those input at G are reconnected so as to be provided at output B and thus dropped as a baseband signal. On the east switching section of FIG. 4 it has been determined by the baseband receive switch 286, that the signals on channel 2 are satisfactory but that the signals on channel 1 are not satisfactory. Thus, it returns command or control signals on each command path to the transmit station 270 requesting it to rechannel IF signals received on input A to the spare transmission path. The transmit station or switch 270 checks path A and determines that at the present time this is an IF switch. Therefore, it reconnects input A to be output at F and thus it is input directly to microwave transmitter 278 rather than being output through an FMT, as would be the case if the signal were baseband. The transmitter 278 transmits these signals to the microwave receiver on the spare channel where it is reconnected within multiline switch 286 from input F to output A thus continuing the channel 1 signals.

As should be realized, the lines may become inoperative merely because maintenance men are interested in shutting down a line to check for possible faulty conditions. It is therefore the intent that inoperative, as defined in the present invention, shall include not only faulty signal conditions but inoperative due to an active participation by anyone involved in the communication system such as maintenance personnel. Although not a part of the inventive concept, the multiline switches as illustrated are continuously checking the received signals and if, in FIG. 4, the multiline switch 264 determined that signals were being satisfactorily received again on channel 2, it would supply signals on the west command path to transmit station 250 to again use channel 2 rather than the spare transmission channel and the spare channel would again be freed for use in future fault or inoperative conditions.

Since the internal design of baseband switches and IF switches are relatively standard, only a few comments will be provided with regard to the operation of FIGS. 5 and 6. As indicated previously, the multiline switch modules were designed such that they had identical electrical connection characteristics. Thus, blocks 326 and 304 are configured such that they will plug into the same openings in the rack. It should be commented, however, that the signals are routed in signal buses such that IF signals are input on pins P2 in the switching modules and baseband signals are input on P1 in the switching modules. Thus, a baseband switch such as 304 ignores any signals which might appear at input P2 and the IF switch 326 ignores any inputs which might appear at P1. While the controls to activate the diode switches within 330 or the relays within 304 are not shown, the design of such switches is relatively standard and is obvious to anyone skilled in the telephone switching art. As shown, a baseband signal may be received on line 300 and input to baseband switch 304. Within this switch it is passed through relay 314 and 316 and output at 318 as long as the channel is deemed operative. The checking of the channel is provided by the sensor 308. Command tone detector 310 converts command tone signals to logic signals used to initiate transmit switches in the same station. Upon detection of some type of failure or inoperativeness in channel 1, signals received on spare baseband channel 1 are input on 340 and passed through the switches associated with terminal 348 so that it can be output to the baseband switch 304 via input terminal 322. In this condition the relay 316 is switched to the second condition whereby signals from the spare are received to be output at 318 and the signals input on line 300 are properly terminated via the resistor shown connected to ground on the other set of contacts for switch 316.

In similar fashion, signals are normally passed from input to output through the IF switch 326 for signals received in channel 2. However, in the case of detection of inoperativeness, as determined by signals received from the microwave receiver, the alternate IF signals received on line 354 are passed through block 356 and output through the diode switch to terminal 364 and passed via line 366 to the P2 input of IF switch module 326. These are then input to switch 326 in place of the channel 2 signals via the diode switches within block 330.

Very similar operations for IF and BB channels occur in FIG. 6 except as previously indicated, the baseband components for the transmit section of the multiline switch were not placed in a single module in view of customer restrictions imposed upon the design of this apparatus. Thus, two separate modules were used and the identical electrical connections of the modules was followed even though all of the IF module circuitry could have been placed in a single unit. Thus, there are very few components within block 402. Again, upon failure of channel 1, channel signals are input on 408, passed through switch 410 and transmitted at the P2 output of block 410. These signals are then passed via lead 412 and input to module 414 where after passing through the amplifier 422 are output via lead 426. Similar conditions are followed where channel 2 or xxx is determined to be inoperative and it is a baseband switch. In this case, signals are transmitted to the spare channel by module 449 via lead 442. The output of module 432 is sent to the baseband amplifier 436 via lead 434. The baseband amplifier 436 has an output at terminal 438.

As will be realized, the FMT 440 is not part of the multiline switch but is shown for completeness in that the output from spare channel baseband amplifier 436 is output at 438 and then passed through an FM transmitter 440 before being applied to switch 428 which selects the one of the two signals to be transmitted over the spare transmission channel.

While the present invention was designed specifically to overcome a cost problem in connection with multiline switches in a repeater station of a microwave link, it will be realized that the inventive concept is applicable wherever a plurality of frequencies need to be switched and the switch designs for these two or a plurality of signals are not compatible, in other words, where the switch for one frequency cannot be satisfactorily used to switch the other frequency. Further, the present design is such that a multiline switch rack can be easily configured or reconfigured to any desired combination of signal frequency switches.

In view of the above, we wish to be limited not by the specific embodiment shown, but only by the scope of the appended claims wherein we claim:

1. The method of improving reliability in a drop and insert repeater portion of a multiline switch system having a single spare transmission frequency channel comprising, the steps of:
   passing all signals to be retransmitted through normal use repeat frequency receive and transmit switches without signal frequency conversion;
   signal frequency downconverting signals to be dropped prior to the drop frequency receive switch;
   passing all signals to be dropped, after signal downconversion, through normal use drop frequency signal receive switches;
   signal frequency upconverting signals to be inserted subsequent to any insert frequency normal use insert transmit switches;
   dividing the received spare channel into two signal paths comprising retransmit and downconverted drop frequency signals;
   passing the spare retransmit and spare drop frequency signals through separate spare repeat frequency and drop frequency receive switches;
   periodically checking signals received at the normal receive switches for quality and switching to the spare repeat or spare drop frequency receive switch upon detection of a faulty signal received at a given normal receive switch in accordance with the type switch previously receiving the faulty signal;
   passing insert frequency signals through insert frequency normal use switches in the transmit switch;
   upconverting signals received from a spare insert frequency transmit switch;
   selecting between the outputs of the spare signal upconverter with the output of the spare repeat frequency transmit switch; and
   switching to the spare repeat or insert frequency transmit switch upon command when a fault occurs in a normal transmit channel.

2. Signal path protection apparatus for first and second frequency signals comprising, in combination:
   multiline signal switch means for use with n working channels including space for at least n+2 switch modules each space having identical electrical connection characteristics;

f1 first frequency type switch modules including a spare channel module each inserted in the appropriate spaces of and electrically connected to said switch means;

f2 second frequency type switch modules including a spare channel module each inserted in the appropriate spaces of and electrically connected to said switch means whereby f1+f2=n+2;

first detection means connected to each of said modules for determining if the module is an f1 or an f2 type module;

second detection means connected to the modules situated in the n working channels for checking the quality of a received signal; and control means for placing on line a spare module of the same type as used in a faulty working channel upon detection of a low quality signal in that channel.

3. The method of protecting a microwave repeater station having n working channels and only one spare channel at a drop and insert location comprising, the steps of:

providing both a spare baseband switching module and a spare IF (intermediate frequency) switching module in a multiline switch;

dividing signals received on the spare channel from a radio receiver into IF and baseband frequencies before applying them to the spare IF and spare baseband switching modules respectively; and passing signals, after a working channel becomes inoperative, through the spare switching module corresponding to that used in the inoperative working channel.

4. Signal path protection apparatus for first and second frequency signals comprising, in combination:

multiline signal switch means for use with n working channels including space for n+2 switch modules each space having identical electrical connection characteristics;

f1 first frequency type switch modules including a spare channel module each inserted in the appropriate spaces of and electrically connected to said switch means;

f2 second frequency type switch modules including a spare channel module each inserted in the appropriate spaces of and electrically connected to said switch means whereby f1+f2=n+2;

detection means connected to the modules situated in the n working channels for checking received signals; and control means for placing in working status a spare module of the same type as used in a non-operating work channel in substitution thereof.

5. Apparatus for protecting a microwave repeater station having n working signal channels and only one spare signal channel at a drop and insert location comprising, in combination:

means for providing both a spare baseband switching module and a spare IF (intermediate frequency) switching module in a multiline switch;

means for dividing signals received on a spare channel from a radio receiver into IF and baseband frequencies before applying them to the spare IF and spare baseband switching modules respectively; and means for passing signals, after a working channel becomes inoperative, through the spare switching module corresponding to that used in the inoperative working channel.

6. Protection apparatus in a microwave repeater station portion of a microwave radio system wherein it is desirable to have all active elements upstream from the receive switch and downstream from the transmit switch, it is undesirable to use baseband switching for any but drop and insert signals and the system is limited to a single spare signal transmission channel comprising, in combination:

receive and transmit multiline switches each including n working channel switches comprising both IF (intermediate frequency) and baseband switches and one each spare IF switch and spare baseband switch;

means for selectively connecting the spare signal transmission channel to each of said spare switches in the associated one of said multiline switches; and means for internally reconfiguring the connection of said multiline switches to use either the spare IF or spare baseband switch in conjunction with the single spare signal transmission channel when one of the n signal transmission working channels is not operational.

7. Protection apparatus for protecting switching apparatus designed to switch signals of first and second frequencies wherein the switch is limited to a single spare transmission channel to be used for either of said first and second frequencies comprising, in combination:

multiline n working channel switches comprising both first and second frequency switches for normally receiving signals from n working transmission channels and additionally one each spare first frequency switch and spare second frequency switch for receiving signals from a single spare transmission channel;

means for selectively connecting the spare signal transmission channel to each of said spare switches in the associated one of said multiline switches; and means for internally reconfiguring the connection of said multiline n working channel switches to use either the spare first frequency switch or spare second frequency switch in conjunction with the spare signal transmission channel when one of the n signal transmission working channels is not operational.

* * * * *